Dec. 7, 1971      R. J. McCALL ET AL      3,624,976
LENS BLOCK AND ADAPTOR THEREFOR
Original Filed May 1, 1967      2 Sheets-Sheet 1
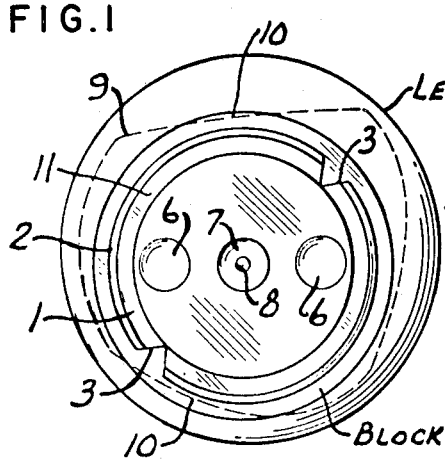
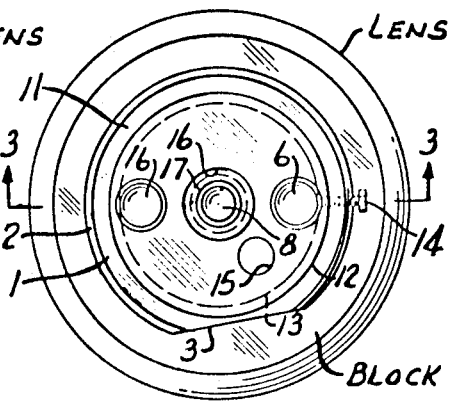
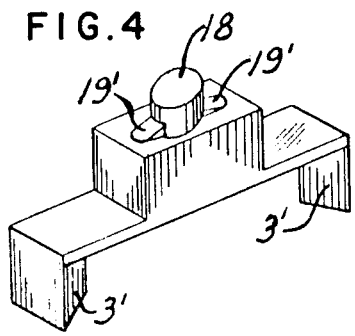
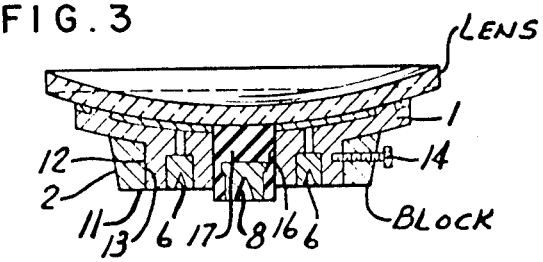
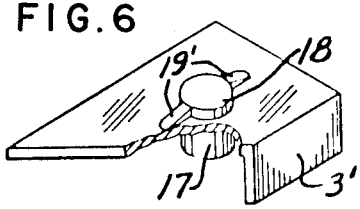
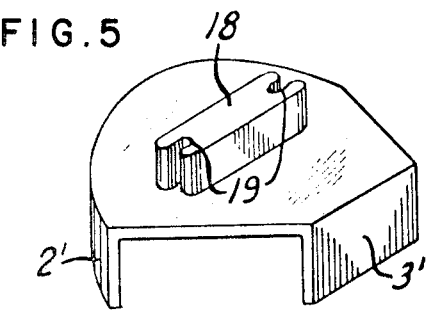
INVENTOR
RICHARD J. McCALL
& ROBERT C. IRWIN
By:
ATTORNEY

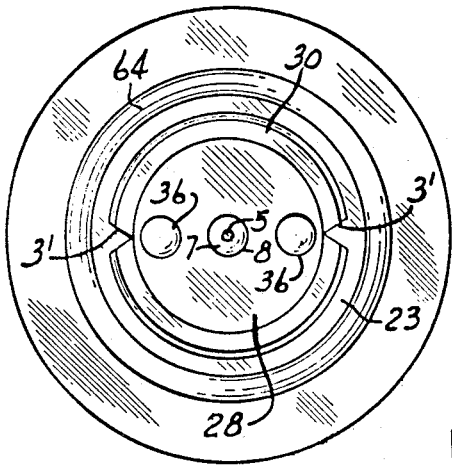
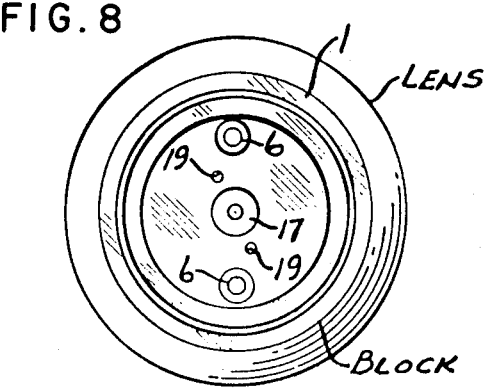
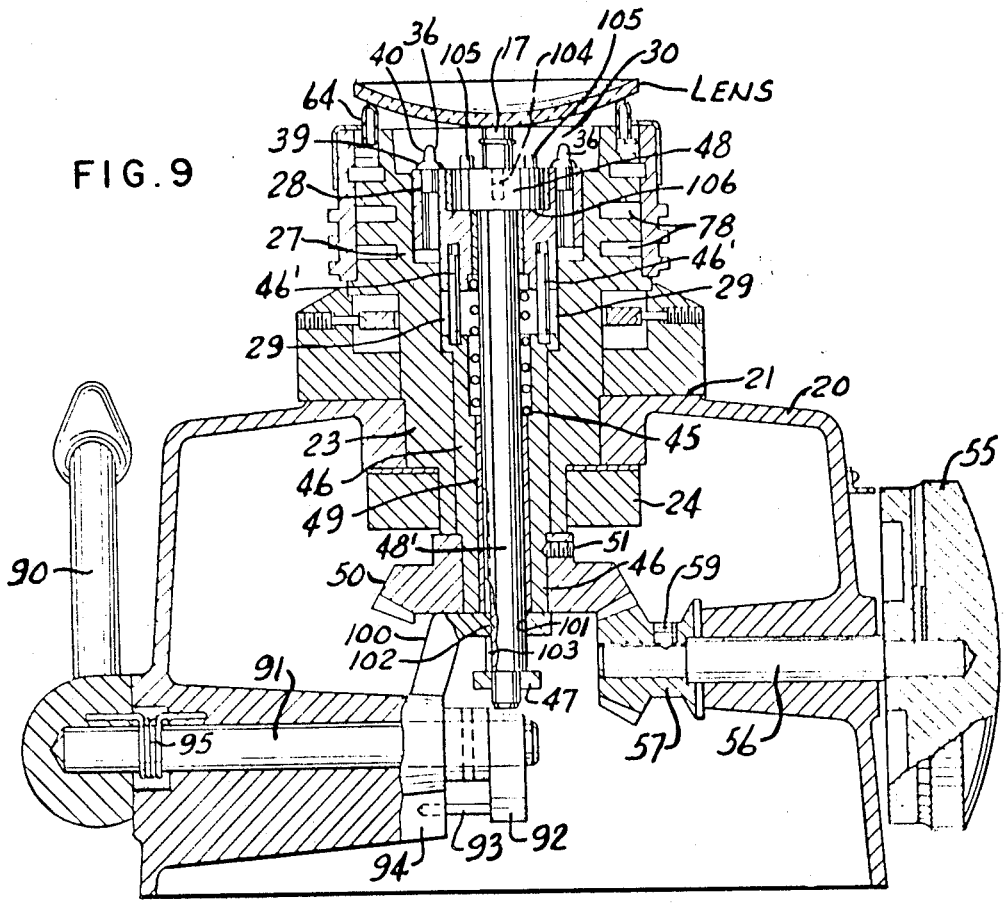

United States Patent Office
3,624,976
Patented Dec. 7, 1971

3,624,976
LENS BLOCK AND ADAPTOR THEREFOR
Richard J. McCall, Summer Hill, and Robert C. Irwin, Stony Creek Township, Cambria County, Pa., assignors to Shuron/Continental Division of Textron Inc., Rochester, N.Y.
Original application May 1, 1967, Ser. No. 635,232, now Patent No. 3,522,677. Divided and this application Mar. 21, 1969, Ser. No. 834,184
Int. Cl. B24b 41/06
U.S. Cl. 51—216                         4 Claims

ABSTRACT OF THE DISCLOSURE

A lens block provided with reference surfaces which locate the lens horizontal layout line and permit the blocked lens to be properly chucked, either directly or by an adaptor positioned on the block, in a lens edge grinding machine for rough edging the lens before generating the same employing the same block used for generating the lens to prescription. The reference surfaces are provided on the molded low melting point metal type block by a lens blocking apparatus having mating reference mold surfaces on the interior walls of the mold cavity.

---

This is a division of application Ser. No. 635,232, filed May 1, 1967 Pat No. 3,522,677.

CROSS REFERENCES 3,049,766  Buckminster  8–21–62  Class 22—58
3,192,676  Buckminster  6–6–65   Class 51—216
3,271,912  Buckminster  9–13–66  Class 51—216

Buckminster Pat. No. 3,049,766 is incorporated herein by reference to complement the disclosure as certain embodiments of the present invention are inventive improvements in the Buckminster lens blocking apparatus as disclosed therein.

BACKGROUND OF THE INVENTION

(1) Field of invention

The present invention relates to the manufacture of ophthalmic lenses, and more particularly to the blocking of lenses so that they can be chucked in the machines for generating and polishing their surfaces and for edge grinding them.

(2) Description of prior art

Buckminster Pat. No. 3,049,766 should be referred to for an explicitly detailed description of the prior art.

In the conventional processes for manufacturing an ophthalmic lens, a lens blank of molded glass or plastic is ground and polished on each of its two sides successively and then is ground on its perimeter or edge. Usually one side is concave and the other convex; and the two surfaces have different curvatures so that the thickness of the lens varies at different points. The shapes and spacial relation of the two surfaces determine the desired optical refraction.

In the grinding and polishing operations, the blank is normally secured to a lens block. The lens block may be of the permanent hard metal type or of the low melting point metal type block which is molded to the lens. The hard metal block is generally secured to the lens blank by means of an adhesive such as molten pitch or by a low melting point alloy. The lens block serves as a means to chuck the lens in the grinding and polishing machines.

Regardless of which block type is used, it usually must be removed for edge grinding the lens and replaced with another block of smaller diameter for this purpose. The block for holding the lens blank during surfacing has to be large enough to back up the glass or plastic lens to avoid breakage, while the block used for holding the lens blank during edging generally has to be small enough to clear the grinding wheel during the edge grinding operation.

In order for the lens to have the desired ophthalmic properties the unfinished side of the semifinished lens must bear an exact and precise relation to the first finished surface of the blank which is mounted by the lens block. The precise location of the second surface surface with respect to the first may require either or both of two adjustments or settings, one called "axis" and the other called "prism." Setting for the axis or cylindrical axis involves a rotation of the second surface with respect to the first, and setting for prism involves a tilting of the second surface with respect to the first. Adjustment for prism, as well as for axis, may be achieved in the blocking operation if so desired.

When the permanent or hard metal type block is employed, the setting for a axis accomplished by orienting or rotating the block about the optical vertex or center of the lens. However the setting for prism is generally incorporated in the grinding machine chuck.

When the soft low melting point lens block is used, both of these settings are generally incorporated in the block mold before the block is molded. Thus the desired prism and axis settings to be imparted to the lens are incorporated in the block itself.

The soft metal block is manufactured by a lens blocking apparatus which has a mold cavity therein. The lens blank is positioned on top of the mold and a heated low melting point alloy is flowed into the mold on one side of the lens blank, and is then allowed to cool adhering itself to the blank. This type of apparatus employs an annular seal or seat about the mouth of the mold upon which the finished surface of the lens blank is seated. The desired amount of prism is incorporated into the mold cavity by tilting the lens seat. The bottom of the mold cavity is provided with a rotatable piston having diametrically arranged pins projecting into the cavity which form bearing recesses in the molded block for chucking the same in cylindrical and spherical generating machines.

The lens is seated on the annular seat such that its ocular vertex or center, as prescribed, is centered over the central pin in the bottom of the mold cavity. The bearing point formed by the center pin is utilized for the transmission of spherical grinding forces.

Molten metal is supplied from a hopper into the lens block mold to fill the mold cavity. Means is provided for flowing water or other coolants around the mold when the pouring operation is completed to solidify the molten metal. The rotatable piston is then urged upwardly breaking the molded block away from the mold cavity.

Regardless of which lens block type is employed, the lens edge will overhang the perimetral edge of the block. This may be accentuated at some portions of the overhanging edge moreso than at others because the lens block by necessity must be centered over the ocular center of the lens rather than the mechanical center of the lens. During surfacing or grinding of the mounted lens the overhanging lens portion is flexed or warped repeatedly due to the fact that no backup surface is provided. This causes the lens to be driven into the perimetral hard edge of the block thereby forming a permanent ring on the finished surface of the lens which renders it useless. This is found to be more common with the plastic lens which has greater flexing qualities than does the glass lens blank.

Flexing of the lens overhang causes the lens to become warped all the way into the center of the lens due to the flexing about the fulcrum point set up by the perimeter of the lens block. As a result the lens is distorted and its molecular structure is broken down rendering it useless.

Others have tried to solve this problem using a larger lens block which covered practically the entire area of the finished lens surface. The block was secured to the lens with an epoxy which proved to be messy and time-consuming and therefore not desirable or practical from a laboratory standpoint.

The problem could also be overcome by edging or grinding off the lens edge before the grinding and polishing operations are initiated. However prior to the present invention this would have to be done in an arbitrary manner while the lens was mounted by its lens block, or an edging block would have to be applied to the lens blank before the lens block for generating and polishing is applied. This, however, would consume valuable time and would require the application of an edging block not only after polishing of the lens but also before.

SUMMARY OF INVENTION

The present invention provides a lens block which may be used not only for generating and polishing the lens, but it also provides a block for edge-grinding the lens before the operations of generating and polishing are initiated, and thereby makes possible a new and novel method of generating a lens whereby the excessive lens edge is removed before generating and polishing the lens by using the same lens block. Removal of the excessive lens edge overhanging the lens block prevents lens warping and flexing thereby saving additional manufacturing time, cost and material.

The lens block normally used for lens grinding and polishing is provided with indexed chucking means or reference surfaces which permit the mounted lens to be chucked relative to the lens horizontal layout line in an edge grinding machine. The reference surfaces may consist of a flat surface, notches or the like, in the perimetral edges of the block or small recesses or projections located adjacent the axial center of the face of the block. The lens is blocked such that its horizontal layout lie is positioned parallel with the reference surfaces or at a known angle therewith.

Instead of chucking the blocked lens directly in the edge grinding machine, an adaptor may be mounted on the block in mating engagement with the reference surfaces, and maybe provided with a smaller edging block for chucking in conventional edging machines using a small chuck.

A hard metal or permanent lens block may be employed in the method of generating a lens as taught by the present invention, wherein the lens edge is ground before generation and polishing. However the excess lens edge may be ground only to the block perimeter. When the soft, low melting point metal block is used, the overhanging lens edge may be reduced beyond the perimetral edge of the block as the soft metal of the molded block is easily removed by the edge grinding machine along the excessive glass or plastic. In either instance, the time required to generate and polish the lens is reduced as there is less lens surface area to work with and the lens will not be damaged from repeated flexing.

Since the lens block is centered with respect to the optical center of the lens, the preliminary lens edging is by necessity performed with this center as the reference rather than the mechanical center of the lens as is required for finish edging the lens to fit the lens frame in conformity with the prescription. Thus the lens edge which is preliminarily removed may be taken off in amount and shape close to that of the finished lens for example within 4 mm. of the desired finished edge, but no further. Otherwise, when the polished lens is reblocked for edge grinding in accordance with a template shape generated about a different lens center, it would be discovered that too much lens edge had already been removed along portions of the lens edge and the lens would have to be discarded.

When the soft melting point metal type block is employed, it is provided with indexed chucking means to permit the mounted lens to be chucked relative to its horizontal layout line for edge grinding.

Other objects and advantages appear hereinafter in the following description and claims.

The accompanying drawings show for the purpose of exemplification, without limiting the invention or claims thereto, certain practicable embodiments illustrating the principles of this invention wherein:

FIG. 1 is a bottom plan view of a lens mounted by a low melting point lens block incorporating the principles of the present invention.

FIG. 2 is a bottom plan view of a hard metal lens block mounted on a lens and incorporating the principles of a further embodiment of the present invention.

FIG. 3 is a cross-sectional view in side elevation taken along line 3—3 of FIG. 2.

FIG. 4 is a perspective view of an adaptor having an edging block for mounting the lens block of FIG. 1.

FIG. 5 is a view in perspective of an edging block adaptor made in accordance with another embodiment of the present invention.

FIG. 6 is a fragmentary view in perspective of an edging block adaptor made in accordance with a structural modification of the adaptor shown in FIG. 5.

FIG. 7 is a bottom plan view of a lens mounted by a lens block illustrating another embodiment of the lens block of the present invention.

Referring to FIG. 1 of the drawings, the lens block illustrated is made from soft metal, being molded on the exterior surface of the lens which may be first coated with plastic material or a tape. The lens illustrated may be a glass lens or a lens molded of plastic material.

The lens block is provided with a cylindrical head portion 1 having a frusto-conical shank portion 2 projecting therefrom and terminating in a circular flat surface that is normal to the axis of the lens block. Opposed perimetral notches 3 are provided in the frusto-conical shank portion 2 in line with the center of the lens block. The notches 3 provide indexed reference surfaces which locate the horizontal layout line of the blocked lens. When the lens block is initially poured with material of a low melting point, the notches 3 are formed by indexed surfaces on the side walls of the mold cavity.

To block the lens shown in FIG. 1, the lens is seated on the mouth of a mold cavity such that the optical center of the lens is positioned over the center of the mold as disclosed in our above-noted pending application Ser. No. 635,232. The lens horizontal layout line is then aligned with the reference surfaces which forms the notches 3, and with a pair of pins which project from a movable piston in the mold bottom. At this time the pins, which provide the cylindrical axis bearing points on the molded block are located at an axis setting of 0° from the horizontal. The piston is then rotated to provide the desired axis setting.

After the hot molten metal has been introduced into the mold and has been permitted to solidify the blocked lens is removed by urging the piston upwardly.

The finished lens block is thereby provided with the outside recesses 6 for cylindrical generation of the lens and the center bearing recess 7' for transmission of the spherical generating forces to the lens. The central recess 7' has a small opening 8' in the bottom thereof which exposes a small portion of the lens surface for the insertion of calipers to measure the lens thickness.

The blocked lens of FIG. 1 may then be chucked in an edging machine chuck provided with surfaces for mating engagement of the indexed reference surfaces 3. The lens is thereby chucked relative to its horizontal layout line and its overhanging or overlapping edge may be removed in accordance with the desired lens shape as indicated by the dashed line 9. However, since the lens block is centered over the optical center of the lens rather than its mechanical center, the edge portion may not be removed to the desired final or finished shape. Otherwise, when the polished lens is reblocked for final edge grinding in accordance with the lens frame opening, it will be discovered that too much of the lens edge has already been removed along portions thereof. Therefore the overhanging portion is generally ground down to within, for example, 4 millimeters of the finished shape.

As indicated at 10 in FIG. 1, portions of the soft metal block may be removed by grinding along with the lens edge to produce the desired shape. However, when the hard metal type block is employed as shown in FIG. 2, the lens edge may not be removed beyond the perimetral edge of the head portion 1.

The conventional edge grinding machines are provided with a chuck of smaller diameter than the lens block. However, the block of FIG. 1 may be readily adapted to be received in such a chuck. For this purpose an adaptor is illustrated in FIG. 4 wherein a small edging block 18 is provided with the reference wedges 3' for mating engagement with the reference surfaces 3 of the lens block of FIG. 1. Thus when the adaptor of FIG. 4 is mounted on the lens block the projections 19' of the edging block 18 are properly aligned with the lens layout line. This is due to the fact that projections 19' are aligned with the wedge points formed by the reference surfaces 3'.

The hard metal block of FIGS. 2 and 3 is generally provided with the same structural features of the block shown in FIG. 1. However, the frusto-conical shank portion 2 thereof comprises a ring or collar 11, which is rotatable on the outside of and is slidably engaged with the cylindrical surface 12 of the block. The surface 12 has an annular groove 13 therearound to receive the tip of the set screw 14 threadably engaged with and passing through the collar 11. The shank portion 2 contains two bearing inserts having aligned recesses 6' for use in cylindrical generation. Once the lens and lens block have been oriented with respect to each other for axis, a molten alloy is poured through the opening 15 into the space beneath the lens blank between the spaced projections 32 on the upper face (FIG. 3) of the block, to seat and secure the block to the lens with the series of recesses 6' and 8' aligned with the prescription cylindrical axis of the lens. The collar 11 is thereafter rotated and locked such that the reference surface 13' is parallel to the horizontal layout line of the lens.

This particular hard metal block is provided with a central opening 16 which receives the resilient shield plug 17 which exposes the ocular vertex area of the lens when removed and seals the same when inserted.

The central bearing 8' is vulcanized into the shield plug 17. The reference surface 13' may therefore be aligned with the horizontal layout line by mounting the block lens in a vertimeter, by which the properties of the lens may be determined by viewing through the window provided by the opening 16, and rotating the main portion of the block relative to collar 11.

Again this hard metal block may be chucked directly in an edge grinding machine having mating surfaces to engage the reference surface 13'. However, most conventional edge grinding machines are provided with a chuck of a diameter smaller than that of the lens block. In this instance an adaptor such as that shown in FIG. 5 is positioned or mounted on the block of FIGS. 2 and 3. The adaptor of FIG. 5 is provided with an edging block 18' having the diametrically opposed recesses 19 at its outer ends to receive mating pins of an edge grinding chuck.

The frusto-conical side wall 2' of the adaptor is provided to mate with the frusto-conical shank portion 2 of the lens block while the flat side wall 31 is in mating engagement with the reference surface 13' of the hard metal block. The surface 13' properly aligns the edging block 18' with the horizontal layout line of the lens, since the block 18 and the recesses 19 are aligned in parallel with the surface 31 and hence with the lens horizontal layout line.

The lens block as gripped by the adaptor of FIG. 5 is maintained in the edge grinding chuck by a resilient backup surface pushing on the unfinished lens surface.

The adapter of FIG. 6 eliminates the frusto-conical wall 2' of the adaptor as shown in FIG. 5 and substitutes therefore a central resilient plug 17' to be received in mating engagement with the central opening 16 of the hard metal block. The edging chuck 181 of FIG. 6 illustrates a slight modification of that shown in FIG. 5 wherein the recesses 19 are substituted by the projections 19' to be received in mating engagement in the edging chuck.

Referring to the mounted lens of FIG. 7, the low melting point soft lens block is provided with the recesses 19 molded directly therein which serve the same function as the recesses 19 found in the adaptor shown in FIG. 5. Referring again to FIG. 7, the mounted lens is also provided with recesses 6, and with the shield plug 17" which is inserted into the mold cavity of the lens blocking apparatus prior to molding the block.

As shown in FIG. 2, the shield plug 17" of FIG. 7 may be removed and replaced with the shield plug of FIG. 2 provided with the central bearing recess 8 for spherical generation of the lens. The shield plug 17 or 17" may be removed during the grinding and polishing operations to determine with a vertimeter whether the lens has acquired the desired opthalmic properties.

I claim:
1. A lens block
adapted to be secured at one end to a lens blank, said block having in its opposite end a plurality of spaced, parallel recesses for receiving the driving members of a machine for generating a surface of a lens blank secured to the block,
the axes of said recesses being in a common plane extending between opposite ends of the block, and
reference means on said block for locating said block in a predetermined position on the spindle of an edge grinding machine,
said means being spaced from said recesses and defining a second plane which extends parallel to said axes,
said reference means being a plane, chordal surface formed on the perimeter of the block and lying in said second plane,
said lens block having on said one end thereof a plurality of spaced projections engageable with a lens blank to support the blank in slightly spaced relation to said one end of the block,
said block having therethrough a hole spaced from said recesses for supplying a molten alloy to the space between said blank and said one end of the block to secure the blank to the block,
said block comprising two members, one of which has a head portion and a reduced diameter shank portion,
said projections being on said head portion and said recesses being in said shank portion,
the other member being a ring rotatably adjustably mounted on said shank portion coaxially of said central recess, and
said plane, chordal surface being formed on the outer peripheral surface of said ring.

2. The combination with a lens block having a head portion, which is adapted to be secured to a lens blank, and having a shank portion which has in its end remote from said head portion a plurality of recesses for receiving the driving members of a machine for generating a surface on the lens blank secured to the block, of:
an adaptor for releasably connecting said block to the driving spindle of an edge grinding machine,
said adaptor having on one end thereof reference means engageable with at least one corresponding reference surface on the periphery of the shank portion of said block to hold said block in a predetermined angular position relative to said adaptor, and means on the opposite end of said adaptor engageable with said driving spindle to hold said adaptor in a predetermined angular position relative to said spindle, said reference surface on said block comprising one of a pair of notches formed in the periphery of said shank portion of said block at diametrally opposite sides thereof, said reference means on said one end of said adaptor comprising a pair of opposed, confronting projections on said adaptor engageable in said notches, and said means on said opposite end of said adaptor comprising an integral, cylindrical projection having opposed radially outwardly projecting shoulders, the centers of which are disposed in a plane containing the projections on said one end of the adaptor.

3. The combination with a lens block having a head portion, which is adapted to be secured to a lens blank and having a shank portion which has in its end remote from said head portion a plurality of recesses for receiving the driving members of a machine for generating a surface on the lens blank secured to the block of an adaptor for releasably connecting said block to the driving spindle of an edge grinding machine, said adaptor having on one end thereof reference means engageable with at least one corresponding reference surface on the periphery of the shank portion of said block to hold said block in a predetermined angular position relative to said adaptor, and means on the opposite end of said adaptor engageable with said driving spindle to hold said adaptor in a predetermined angular position relative to said spindle, said reference surface on said block being a plane, chordal surface formed on the perimeter of said shank portion of said block for coplanar engagement by a corresponding plane surface formed on said one end of adaptor, said means on said opposite end of said adaptor defining a second plane parallel to said plane surface on said one end of the adaptor, and said means on said opposite end of said adaptor comprising a cylindrical projection having diametrally opposed, radial projections the center lines of which lie in said second plane.

4. The combination with a lens block having a head portion, which is adapted to be secured to a lens blank and having a shank portion which has in its end remote from said head portion a plurality of recesses for receiving the driving members of a machine for generating a surface on the lens blank secured to the block, of an adaptor for releasably connecting said block to the driving spindle of an edge grinding machine, said adaptor having on one end thereof reference means engageable with at least one corresponding reference surface on the periphery of the shank portion of said block to hold said block in a predetermined angular position relative to said adaptor, and means on the opposite end of said adaptor engageable with said driving spindle to hold said adaptor in a predetermined angular position relative to said spindle, said reference surface on said block being a plane, chordal surface formed on the perimeter of said shank portion of said block for coplanar engagement by a corresponding plane surface formed on said one end of the adaptor, said means on said opposite end of said adaptor defining a second plane parallel to said plane surface on said one end of the adaptor, and said means on said opposite end of said adaptor comprising a pair of spaced, parallel recesses for receiving a pair of spaced driving pins on said spindle, the axes of said pair of recesses lying in said second plane.

References Cited

UNITED STATES PATENTS

| | | | |
|---|---|---|---|
| 2,573,668 | 10/1951 | Long | 51—217 |
| 2,603,922 | 7/1952 | McCarthy | 51—277 |
| 3,140,568 | 7/1964 | Beasley | 51—216 |
| 3,321,870 | 5/1967 | Bolden | 51—216 X |
| 2,734,322 | 2/1956 | Vaughan | 51—277 |
| 2,441,472 | 5/1948 | D'Avaucourt | 51—216 |
| 2,859,568 | 11/1958 | Dantzie | 51—277 X |
| 3,512,310 | 5/1970 | Rudd | 51—284 |

FOREIGN PATENTS 630,402   10/1949   Great Britain.

HAROLD D. WHITEHEAD, Primary Examiner